US012704478B2

(12) United States Patent
Wallace et al.

(10) Patent No.: US 12,704,478 B2

(45) Date of Patent: Aug. 11, 2026

(54) ROOT CAUSE DETERMINATION OF STEEL CORD DAMAGE USING MAGNETIC BASED MONITORING SYSTEM AND METHODS

(71) Applicant: ContiTech Transportbandsysteme GmbH, Hannover (DE)

(72) Inventors: Jack Bruce Wallace, Powell, OH (US); Jacques Frederick Basson, Braga (PT); Atrayee Neog, Hamburg (DE)

( * ) Notice: Subject to any disclaimer, the term of this patent is extended or adjusted under 35 U.S.C. 154(b) by 119 days.

(21) Appl. No.: 18/361,993

(22) Filed: Jul. 31, 2023

(65) Prior Publication Data

US 2025/0044256 A1 Feb. 6, 2025

(51) Int. Cl.
*G01N 27/82* (2006.01)
*B65G 15/36* (2006.01)

(52) U.S. Cl.
CPC ............. *G01N 27/82* (2013.01); *B65G 15/36* (2013.01)

(58) Field of Classification Search
CPC ................................ G01N 27/82; B65G 15/36
See application file for complete search history.

(56) References Cited

U.S. PATENT DOCUMENTS

| | | | | |
|---|---|---|---|---|
| 4,439,731 | A | 3/1984 | Harrison | |
| 5,426,362 | A | 6/1995 | Ninnis | |
| 7,810,634 | B2 | 10/2010 | Wallace et al. | |
| 7,894,934 | B2 | 2/2011 | Wallace et al. | |
| 7,942,258 | B2 | 5/2011 | Wallace et al. | |
| 8,256,607 | B2 * | 9/2012 | Wallace | B65G 15/36 198/810.02 |
| 9,702,853 | B2 | 7/2017 | Wallace et al. | |
| 9,815,634 | B1 | 11/2017 | Wallace et al. | |
| 10,150,622 | B1 * | 12/2018 | Wallace | B65G 43/02 |
| 10,710,119 | B2 | 7/2020 | Kumar et al. | |
| 11,137,772 | B2 | 10/2021 | Theobald | |
| 11,300,505 | B2 * | 4/2022 | Wallace | G01N 21/89 |
| 11,600,073 | B2 | 3/2023 | Olmstead et al. | |
| 2003/0233895 | A1 * | 12/2003 | Shori | F16G 5/16 73/865.9 |
| 2008/0257692 | A1 | 10/2008 | Wallace | |
| 2010/0025198 | A1 * | 2/2010 | Wallace | B65G 43/02 198/810.02 |

(Continued)

FOREIGN PATENT DOCUMENTS

| | | | |
|---|---|---|---|
| CN | 104670845 | A | 6/2015 |
| CN | 114044325 | A | 2/2022 |

(Continued)

OTHER PUBLICATIONS

International Search Report dated Jul. 31, 2024 of International Application PCT/EP2024/071745 claiming priority this application.

*Primary Examiner* — Dominic E Hawkins

(74) *Attorney, Agent, or Firm* — Iken S. Sans; Richard A. Wolf; Gregory Adams

(57) ABSTRACT

A system for monitoring conveyor belts is disclosed. The system includes a generator array, a sensor array and circuitry. The generator array is configured to apply a magnetic field to a conveyor belt. The sensor array is configured to measure a plurality of magnetic responses. The circuitry is configured to determine the source or cause of the observed steel cord damage based on the measured plurality of magnetic responses.

18 Claims, 13 Drawing Sheets

(56) References Cited

U.S. PATENT DOCUMENTS

| | | | | |
|---|---|---|---|---|
| 2010/0122893 | A1* | 5/2010 | Wallace | B65G 45/02 198/810.02 |
| 2015/0144459 | A1* | 5/2015 | Wallace | B65G 43/02 198/502.1 |
| 2015/0151922 | A1 | 6/2015 | Wallace et al. | |
| 2016/0023865 | A1* | 1/2016 | Fargo | B66B 7/12 324/693 |
| 2016/0068350 | A1 | 3/2016 | Wallace et al. | |
| 2017/0305682 | A1* | 10/2017 | Wallace | B65G 15/36 |
| 2017/0359953 | A1 | 12/2017 | Wallace et al. | |
| 2018/0231167 | A1 | 8/2018 | Wallace et al. | |
| 2018/0273303 | A1 | 9/2018 | Wallace et al. | |
| 2020/0282585 | A1 | 9/2020 | Finnsson | |
| 2021/0018542 | A1* | 1/2021 | Bates | G01R 23/20 |
| 2021/0354926 | A1* | 11/2021 | Makhal | G06N 3/09 |
| 2022/0305821 | A1* | 9/2022 | Matsumoto | B41J 13/08 |
| 2023/0075394 | A1* | 3/2023 | Schlezinger | H10P 72/0616 |

FOREIGN PATENT DOCUMENTS

| | | | |
|---|---|---|---|
| EP | 2876063 | A1 | 5/2015 |
| EP | 3910321 | A1 | 11/2021 |
| KR | 20220161133 | A | 12/2022 |
| WO | 2021122632 | A1 | 6/2021 |
| WO | 2023073189 | A1 | 5/2023 |

* cited by examiner

ROOT CAUSE DETERMINATION OF STEEL CORD DAMAGE USING MAGNETIC BASED MONITORING SYSTEM AND METHODS

FIELD

The field to which the disclosure relates is rubber products, such as conveyor belts, exposed to harsh conditions, and in particular, the use of sensors for scanning and/or monitoring damages/defects/tears in steel cord containing rubber products.

BACKGROUND

It is common to employ a heavy-duty conveyor belt for the purpose of transporting products and material. The conveyor belts so employed may be long, for example, in the order of miles, and represent a high-cost component of an industrial material handling operation. Such conveyor belts can be as large as ten feet wide, and possibly as thick as three inches. Typically, the main belt material is a moderately flexible elastomeric or rubber-like material, and the belt is typically reinforced by a plurality of longitudinally extending metal cables or cords, which are positioned within the belt and extend along the length thereof. Such conveyor belts are often used to transport bulk material below and/or above ground, for example, in mining applications. The conveyor belts and respective drives are susceptible to normal wear and tear, which can include damage from the material being transported and/or harsh environmental conditions. In the event the conveyor belt suffers catastrophic damage or otherwise becomes inoperable, the costs of repairing the conveyor belt, cleaning up the spilt material, and related downtime are substantial.

A problem associated with the use of the steel reinforcing cords is that with continued use of the conveyor belts, over time, the cords tend to deteriorate. For example, there may be a crack, generated by impact or other damage event in the conveyor belt elastomeric material that permits water to contact one or more of the cords, which could potentially lead to corrosion of the cords. Cord damage may also result from a number of other events that may include an aggressive impact of the product or material being transported on the conveyor, trapped material at a pulley due to material traveling on the return belt or spillage, changes to or improper conveyor design elements (material drop height, short transitions, pulley diameter, drive tension, slip, etc.), conveyor component damage or maintenance issues (pulley lagging wear or damage, idler failure, idler or pulley misalignment, idler and pulley cleanliness, etc.), effectiveness of the crusher operation that impacts ore properties (ore size, abrasiveness, or other characteristic), belt alignment, as well as foreign objects that are processed with the ore that can cause damage.

Because the cords are concealed inside the elastomeric material of the belt, it is challenging to detect any damage. Unfortunately, when the damage is sufficiently severe such that it becomes outwardly visible, a catastrophic failure of the belt may occur. More commonly, the damage may result in a condition that would make further use of the belt dangerous. For this reason, among others, it has generally been a practice in the industry to overdesign the belts by providing an adequately large margin of error which enables the belt to function reasonably safely even if the reinforcing cords are moderately damaged.

Accordingly, it has become customary practice to monitor the condition of the conveyor belt with the objective to identify damage to the conveyor belt's reinforcing cords, to reduce the likelihood of complete failure and to provide timely repairs and other prophylactic maintenance. Monitoring effectively increases the life or longevity of the belt. In this regard, one frequent practice is to have an annual or bi-annual analysis conducted on the conveyor belt. To this end, typically a separate entity other than the owner or user of the conveyor belt, such as the manufacturer of the conveyor belt or some other third party (e.g., an outside consultant), will come on-site and set up a monitoring system in order to collect data on the conveyor belt during use. Data will be collected for multiple revolutions of the conveyor belt and may take several hours to complete. Once the data is collected, the outside consultant will leave the on-site location and take the data to another, remote location for analysis. The data will then be reviewed, and a report generated providing details on the condition of the conveyor belt and any recommended maintenance. Depending on the consultant, the analysis and report may take anywhere from a few days to a few weeks to complete.

Continuous monitoring systems have been developed that collect data on the conveyor system to detect damage which could generate further actions, which could include belt inspections, repairs, or the replacement of sections of the conveyor belt. In some cases, continuous monitoring is utilized, but these systems only provide a classification of a specific damage event or group of local events with recommended action items for the specific damage event(s) identified. These systems do not consider the cause of the damage event.

It is appreciated that systematic failures that occur on the belt due to different causes can generate signature damage patterns on the belt that can be analyzed to facilitate the identification of the root cause of the damage. Furthermore, by identifying the source or root cause of the damage and correcting the issues generating the damage, the customer can potentially avoid further damage, conveyor downtime and extend the life of their conveyor belt. The result of this process increases production capacity due to eliminating damage sources, thus reducing downtime, and lowering the cost of material conveyed.

To achieve this solution, what is needed is techniques to scan and/or monitor conveyor belts that map the damage, recognize damage patterns, and identify potential sources of the mapped damages. Furthermore, monitoring techniques, like this, are needed to maximize the life and safe operation of conveyor belt applications while optimizing the process efficiency of the conveying process.

DETAILED DESCRIPTION

Figures 1, 2:
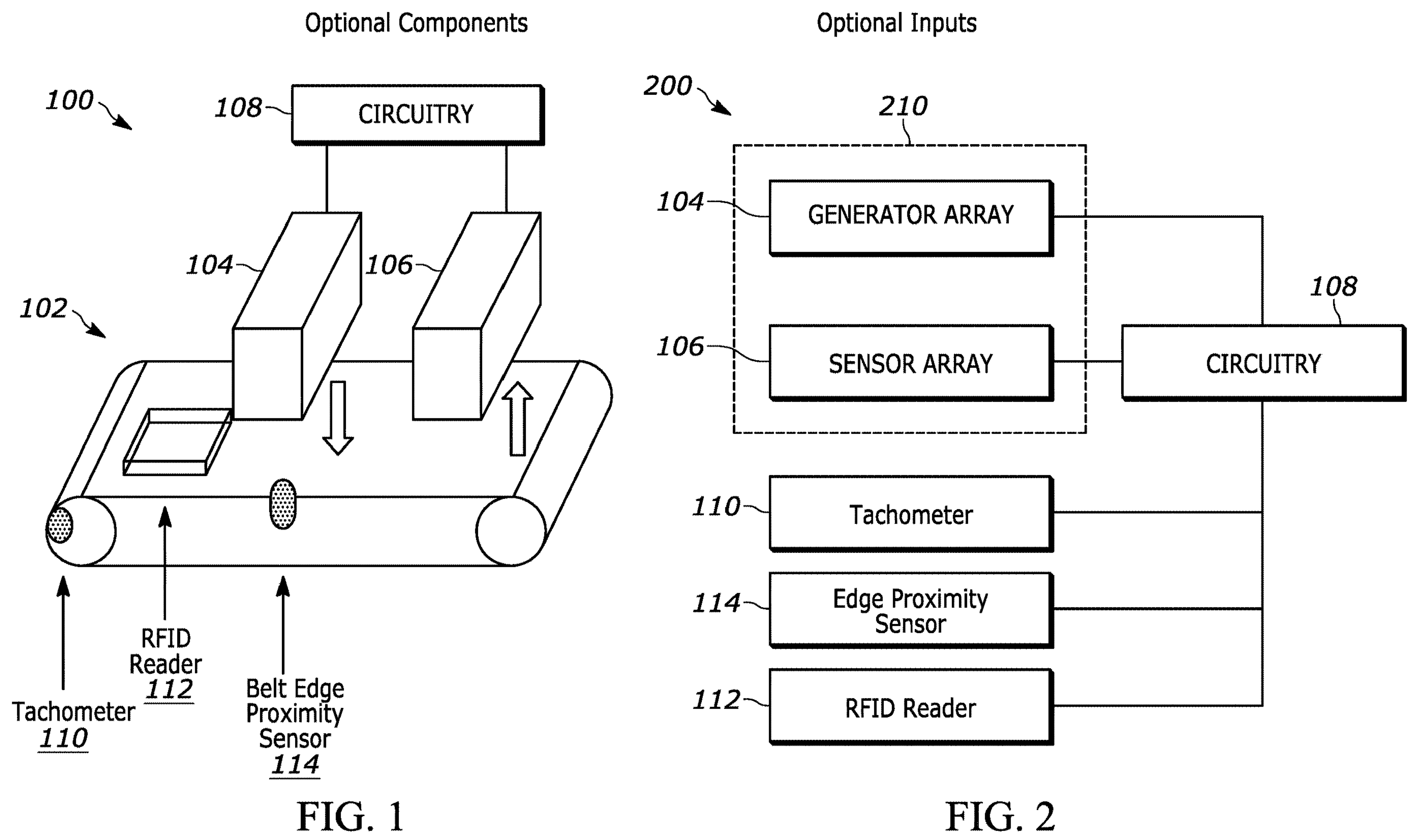
FIG. 1 is a diagram illustrating a system 100 for conveyor belt damage detection, monitoring and analysis in accordance with one or more embodiments.
FIG. 2 is a diagram illustrating a system 200 for scanning a conveyor belt in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, with the understanding that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Conveyor belts can include reinforcing steel cords that are embedded in the belt. The steel cord elements run in a longitudinal direction. The cords and/or other reinforcements in one or more embodiments include ferromagnetic materials. Some examples of ferromagnetic metals include iron, nickel, cobalt, gadolinium, dysprosium and alloys such as steel that also contain specific ferromagnetic metals such as iron or nickel. The cords and/or reinforcements provide substantial strength for the belts. It should also be noted that some conveyor belts can have periodic or continuous transverse steel cord elements. For example, periodic elements that are monitored to detect longitudinal rips or continuous elements, such as a breaker, that minimizes damage of the reinforcing longitudinal cords by distributing highly localized mechanical loads over several cords, instead of a single longitudinal cord.

Over time, the embedded cords can degrade, become damaged and break. This can be due to environmental conditions and use. Once degraded, the strength of the conveyor belt is weakened, which can lead to rips, tears and/or belt failure.

Customers or belt operators typically rely on belt monitoring and conveyor technical consultants to assess belt damage and determine the cause of the damage. The recommendations are typically based on conveyor belt damage patterns and the technical consultant investigates the potential causes of the damage based on their experience and knowledge of where damages typically occur on conveyor systems, such as: wear events (abrasive material, poor positioning of cleaners/scrapers, skirt board wear, etc.), steel cord damage due to high strain events (trapped material, pulley lagging damage, impacts, etc), edge cord damage (short transitions, mis-tracking, interaction with belt structure or accessories, etc). This process can often take time to investigate, report and validate root cause(s) of the damage events.

Belt monitoring tools can analyze cord damages individually, and many scanning systems provide the customer with a critical damage analysis for making decisions about individual damages, such as whether to perform a repair in order to maintain belt integrity so that the belt can safely carry its material load.

Embodiments are disclosed that assist the end user to better identify the source or root cause of steel cord damage. This can be achieved by using empirical data collected on a specific conveyor process that had specific damage patterns which could be associated with a specific damage event, and by applying analysis tools to historical data sets containing many conveying applications with known conveyor design and processing criteria and the resulting damage patterns, in order to develop an algorithm tuned to facilitate the identification of a root cause(s) for that damage pattern.

Embodiments/systems for conveyor belt monitoring can analyze the damage patterns for trends that could potentially address active root causes that are causing belt damage. By adding this algorithm to the conveyor belt scanning technology, a tool is provided to accelerate the process of identifying and addressing the root cause of damage in conveyor belts, allowing the end user to potentially avoid additional damage events and, as a result, extend the operational life and capacity of the conveyor system.

FIG. 1 is a diagram illustrating a system 100 for conveyor belt damage monitoring and root cause analysis in accordance with one or more embodiments. The system 100 is provided for illustrative purposes and it is appreciated that suitable variations are contemplated.

The system 100 can utilize existing magnetic scan data sets in order to explore past conveyor belt cord damage data sets with known damage patterns and associated root causes for given belt designs, specific system designs and applications. Additionally, the system can study the development of the damage patterns over time to better isolate a specific root cause or causes. The system can utilize these datasets for training of an algorithm to identify damage patterns and associated potential root causes.

A conveyor belt monitoring system can detect and map cord damages using magnetic scanning technologies. Conveyor belt design rules can then be used to determine the risk for a specific damage of measured size and location on the conveyor belt's strength. A large impact to the conveyor belt strength affects its ability to safely move material without the risk of a catastrophic failure.

The system 100 performs continuous monitoring of conveyor belts using analytics to analyze damage events to identify damage patterns and associate these patterns with known and/or predefined root causes for the damages which would compromise the conveyor belt's ability to transport or convey material.

In one embodiment of the system 100, the system utilizes machine learning tools, artificial intelligence (AI), and the like, to define root causes from the specific application. The system 100 method (e.g., FIG. 9) can include a larger data set from one or more other conveyor systems used in different applications and can include a variety of different belt or conveyor system designs to generate insights to predict root causes of damages from a more global dataset.

The machine learning associated with the system 100 and the belt being monitored could be achieved using different methodologies and tool sets. In one embodiment, the damage root cause analysis in the system's algorithm, could be carried out by a two-step process. A first step could be image classification and pattern recognition. Image classification and pattern recognition is a popular and effective machine learning technique where an algorithm learns to recognize the objects in an image, based on the information, such as intensity, contrast, color, contours, etc., embedded in every pixel of the image. Sensor based images such as magnetic heat maps, region plots, infrared images, etc., contain a lot of pixel-based information and can be used to train state-of-the-art neural network architectures like Res Net, Attention Net etc., using Transfer Learning. Pattern recognition in the different failure modes is essential to predict a failure before it occurs. With the help of the neural network architectures, the failure trends over time can be studied based on the progression of the image data. The images can range from (but not limited to) 1000×80 to 8000×320 pixels and are initially labelled manually by experts and categorized into different failure categories. Pre-processing using simple image processing techniques aids in the extraction of important information from the images and enables better training and classification. The algorithm is typically trained on 70% of the data and validated on the remaining 30% of the data. AWS services like the SageMaker, S3, ECS etc. can be utilized for data storage, training and hyperparameter tuning the model as well as for deploying the trained model for inference. The performance of the model could be monitored via ml flow using evaluation metrics like (overall and class-wise) accuracy, precision, recall, f1 score etc. Once the model is trained, it can be used in inference mode for predicting the failure classes for new batches of images. The model is used to understand the progression of the failure in the form of the images and predict the failure based on this pattern recognition.

After the image has been classified into a failure category, the system 100 would correlate the damage pattern to its root cause. Statistical and technical data which have been observed to have been the root causes of failures in the past could be collected and stored in a database. For example, this larger dataset could contain technical data which would include the reinforcing steel cord size and pitch (spacing), gauge and composition of the rubber pulley and carry covers, belt splice design, presence of transverse breaker material, details about the conveyor structure and process, including the skirt board position, pulley diameter, material drop height, cleaners, plows, idler configuration, belt design safety factor, drive power, etc. Statistical data could include steel cord damage rates, damage pattern development, conveyor belt alignment, etc. Observation of the progression of failures over time along with geometric inter-relationships between damages in images, and historical and contextual information to correlate to the specific failures, allows for a better prediction of the root cause for these failures.

In order to take the damage pattern's development into consideration, time is another factor that comes into the analysis. As a result, the two-step analysis is carried out mainly using two configurations: the image classification and pattern recognition for a failure prediction is carried out at a local level, meaning the classification of the images into the various failure categories, are fine-tuned to the local conveyor level. To account for the time component, the algorithm is trained to recognize the progression, or the trend of damage events based on large datasets of sequential images collected over a period, from multiple conveyors. The algorithm is trained to identify the pixel-level changes in the sequence of images over time until it can predict the occurrence of a failure before it occurs. Hence, the classification is carried out at a local level, with a time and image-based analysis of the incoming data. For the second configuration, the root cause analysis of the failure is a systematic study. Monitoring of the root causes of failures from data collected from configured systems across the globe can be used to correlate the progression of the failure in the images with local parameters from the conveyor (as mentioned above) by comparing them to previously recorded failure trends in other systems around the globe. This comparative analysis of all the data from all the systems across the globe and the failure progression in the images considers not just local conveyor settings and environmental conditions, but also the learnings of the causes of such damages from data coming from across the globe. Hence the analysis needs to be performed using cloud platforms like AWS, Azure, etc. for a higher-level insight into the pattern correlation and identification of the root cause.

The system 100 includes a transmitter/generator array 104 and a sensor array 106 and circuitry 108 and operates on a conveyor belt 102. The system could also include additional sensors, such as an edge proximity sensor 114 that monitors the belt's lateral position to monitor its fleet or lateral position of the conveyor belt. Some other examples of suitable sensors include a tachometer 110, an RFID reader 112, and the like. This allows for more accurate alignment of the magnetic damage data to the conveyor belt 102 and conveyor structure positions.

The belt 102 includes magnetizable cords along a longitudinal or running direction of the belt. The conveyor belt 102 can be a composite of fabric, polymeric material and the like. The belt 102 can have one or more splices. The belt 102 can include transverse elements, such as fiber, fabric, steel cords and the like. The belt 102, in this example, includes magnetizable cords along a longitudinal or running direction of the belt. The belt 102 includes longitudinal steel cord elements that carry a load being conveyed.

The system 100 and/or circuitry 108 is configured to develop damage patterns and development over time can be utilized by the AI/Machine learning tools to facilitate the identification of root cause for the damages in the belt and make the results of these analyses known to the customer or user to guide resolution by eliminating the source of the damages or root cause. This limits damage to the conveyor belt and results in better maintenance of the belt and/or conveyor system.

In one example, from machine learning, the identification of the root cause accelerates its correction, which may be a result of the belt interacting with a failing conveyor component (lagging, idlers, etc.) or wear of a maintenance item (cleaners, skirt board, etc.). Thus, the health of the entire conveyor can be improved by identifying the root cause of the damage. In some cases, the root cause may be design related and result in the need to make a change to the conveyor, such as increasing the transition length, reducing the material drop height, etc.

The conveyor belt 102 can include a polymeric top cover material, including but not limited to rubber, PVC, polyurethane, and the like, a reinforcing or protective ply (plies)/layer(s) having a fabric/textile layer and a bottom-coated polymeric layer.

Some example compositions of plies/layers for the belt 102 include:

- Polymer-Textile #1-Textile #2- . . . Textile #N-Polymer Layers (where there can be 1 to N textile-reinforcing layers)
- Polymer-Textile Breaker-Steel Cord-Polymer Layers
- Polymer-Steel Cord-Textile Breaker-Polymer Layers
- Polymer-Textile Breaker-Steel Cord-Textile Breaker-Polymer Layers
- Polymer-Textile Reinforcement-Steel Cord Breaker-Polymer Layers
- Polymer-Steel Cord Breaker-Textile Reinforcement-Polymer Layers It is appreciated that the system 100 is monitoring transverse or longitudinal steel cords elements contained within a conveyor belt 102.

It is appreciated that the system 100 can separate longitudinal cord damage from transverse cord damage, giving the ability to analyze these damages separately for systematic failures and potentially identify the root causes associated with the transverse steel cord damages. With the isolation of the transverse vs longitudinal magnetic poles, the longitudinal and transverse damage can be separated by these two events. Thus, a map of the position of transverse elements cord breaks can be detected and analyzed for a damage pattern by applying the same methodologies as previously described. In other words, these transverse elements damages could also be used to investigate and/or determine root causes that are related to process or system design. Hence, the algorithm of system 100 can also be used to identify different failure modes for the damage patterns observed in the breaker material, that could include for example: conveyor belt fold-over events, large impact damage, idler junction failure, trapped material, etc.

The belt 102 is composed of at least one segment. A single segment of the belt 102 is shown in FIG. 1 for illustrative purposes. Each segment begins and ends with a belt splice to form an endless conveyor belt. A complete conveyor belt that runs on a conveyor system will consist of at least one belt segment.

The generator array 104 generates and applies a magnetic field to a portion of the conveyor belt 102. The portion is generally below the generator array 102. As a result, the cords are magnetized and generate a magnetic field, referred to as the cord magnetic field.

The sensor array 106 measures a magnetic response based on the cord magnetic field for each segment of the belt 102.

The circuitry 108 can also be configured to read or detect embedded elements, such as RFID tags and the like. In one example, the circuitry 108 includes an RFID reader 112. The detected embedded elements have known locations on the conveyor belt 102 and can be used to facilitate location of identified defects.

The circuitry 108 can also be configured to read or detect the lateral position of the conveyor belt using a sensor like the proximity sensor 114 to better quantify the lateral position of the conveyor belt. It is noted that there are many proximity sensor technologies that can monitor the transverse displacement of the belt that could include, but are not limited to, laser distance sensors, ultrasonic or capacitive sensors.

The circuitry 108 can also be configured to detect longitudinal position of the conveyor belt along the conveyor system length using a tachometer 110 to better monitor the position of the damage along the conveyor belt. The term tachometer is used, but it is understood that these could include, but are not limited to, encoders mounted to a conveyor pulley or idler, proximity sensors monitoring targets on the pulley, or a non-contact laser device that can measure the displacement and speed of conveyor belt.

The circuitry 108 can also be configured to identify alarm conditions and generate/trigger alarm notifications. The circuitry 108 can determine, for example, when new damage has occurred that has exceeded the minimum detection threshold values, generate a notification identifying the defect and, if necessary, generate an alarm with the location and size of the defect. In another example, the circuitry can 108 can determine that a size of damage has exceeded a threshold value over time and generate an alarm based on the increasing size of the damage event.

FIG. 2 is a diagram illustrating a system 200 for scanning a conveyor belt in accordance with one or more embodiments. The system 200 is provided for illustrative purposes and it is appreciated that suitable variations are contemplated.

The system 200 is substantially similar to the system 100 and includes additional details about circuitry 108.

The system 200 includes the circuitry 108, the generator array 104 and the sensor array 106.

The circuitry 108 maps the damage and splice locations for one revolution of the conveyor belt 102, and this map is stored on the system. The system then measures further movement of the belt and compares the new data with the previously recorded data. In one embodiment of the system 100, the splice after the shortest segment is identified as splice number 1, and the splices detected afterwards are numbered sequentially. Similarly, the damages can then map sequentially based on the time of detection and position relative to the zero-reference point in the belt map. As the conveyor belt 102 operates, damages are mapped by their position along the length of the conveyor belt 102 and their transverse position relative to the edge of the belt. The circuitry 108 can utilize the methodology outlined above, using the damage data and magnetic images 301, 302 in FIG. 3*a*, as input to the algorithm to initiate pattern recognition and potential root cause for generating the damage events.

The circuitry 108 can explore past pattern data sets, with known root causes, to facilitate the generation of root cause insights from larger data sets including different conveyor designs and applications. The past data sets include measured magnetic responses for the damage patterns, along with the known identified root cause associated with the specific damage pattern. In some cases, these patterns can be associated with spatial proximity to one another, to a position on the conveyor belt, or to the belt structural design elements, such as conveyor pulley, transition lengths, turn overs, take-ups, idlers, etc., or conveyor accessories, such as cleaner, scrapers, skirt boards, plows, etc. In other cases, the pattern data may be time dependent and as such the development of the damages over time could add a time dependency to the pattern development that could contribute to the identification of the root cause of damage.

The circuitry 108 can apply design knowledge of conveyor belts to determine the impact to the strength of the conveyor belt. The system 100 uses rules associated with how to react to a specific damage size as defined by common conveyor belt rules. The circuitry 108 uses specific damage separations and geometries to establish observed patterns in the magnetic image data and using machine learning tools, for example, can apply a higher-level analysis to correlate the detected pattern to known root causes to provide insights on potential root causes for the damage events being observed. Additionally, by using the damage location in comparison to the conveyor's structural elements, the system can also apply a higher-level analysis of the damage based on location and repeatability of damages. Examples of this could include; the damages are at a spacing aligned with a specific rotation of a pulley such that they are separated longitudinally by a distance equivalent or close to the pulley circumference, or whether the belt damages align with the location of idler junction gaps, or whether the damages align with the chute's skirt board structure, or if the frequency of the damage indicates a transition length in the belt is too short.

The circuitry 108 could also be configured to monitor pattern development to differentiate potential damage sources to facilitate the root cause identification process. In the event a given damage pattern has more than one associated root cause, the development of the damage pattern over time could also be used to facilitate the identification of the multiple root causes.

The circuitry 108 could utilize machine learning tools that could involve artificial intelligence (AI), or other methodology, this process could be taken to another level where data from one or more other conveyor systems with distinctive designs can be utilized to predict belt failure, outside of the belt design analyses that were conducted in the previous analysis.

In one example, the circuitry 108 includes a machine learning algorithm that is developed to identify a plurality of individual damage events as having a pattern and use this pattern to generate potential insights on the cause of the damage (root cause). The recognized pattern can be further analyzed against the known system configuration data to further tune the generated insights to a narrower set of root causes. This embodiment could be further enhanced if the data set was expanded to include the learnings of different conveyor belt designs operating on different conveyor structural designs and in different conveying applications, in order to maximize the potential learnings associated with pattern recognition and the resulting generation of root cause insights.

Figure 3A:
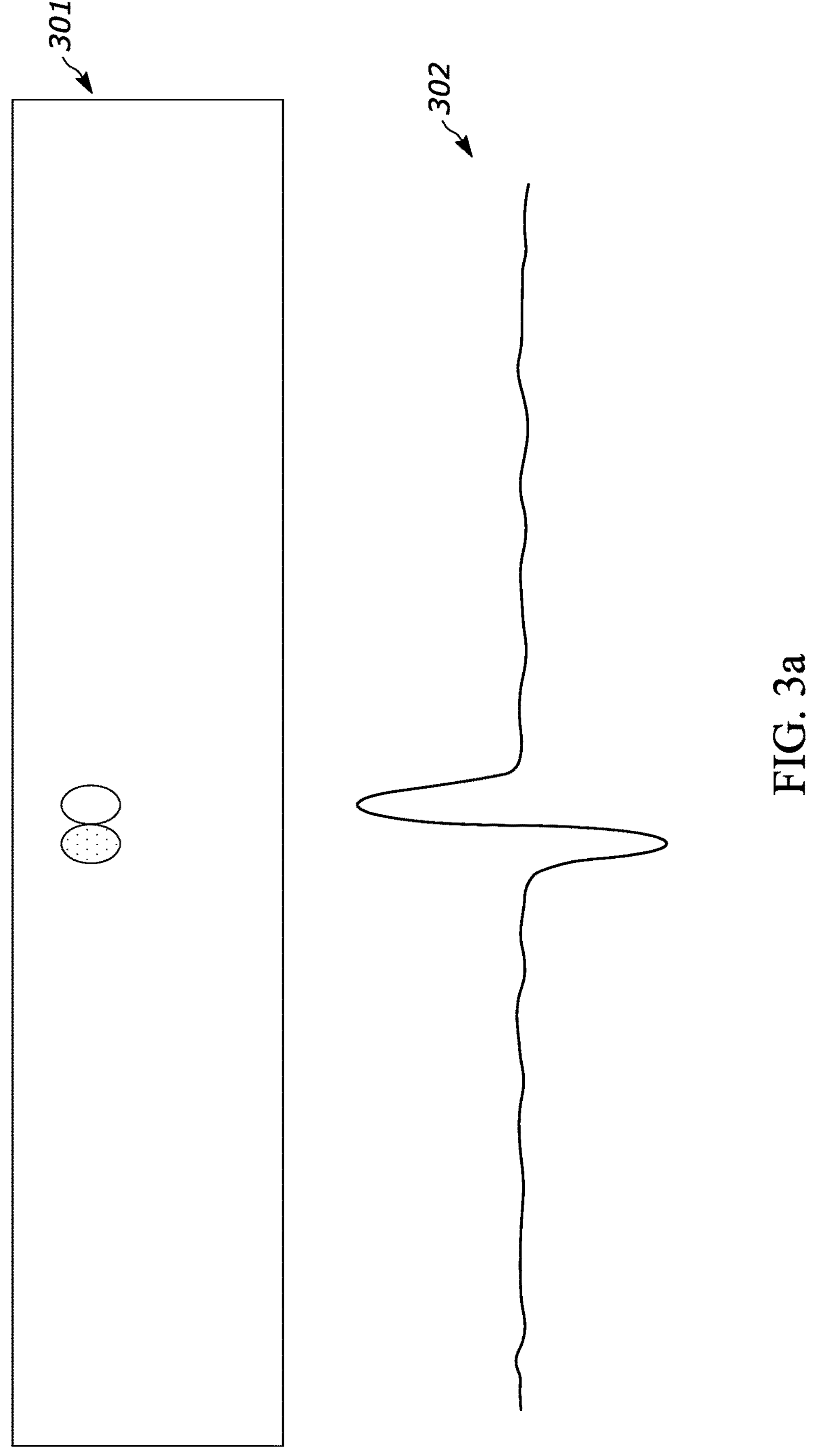
FIG. 3*a* is a diagram illustrating a magnetic image showing the magnetic response associated with breaks in the longitudinal direction.
Figure 3B:
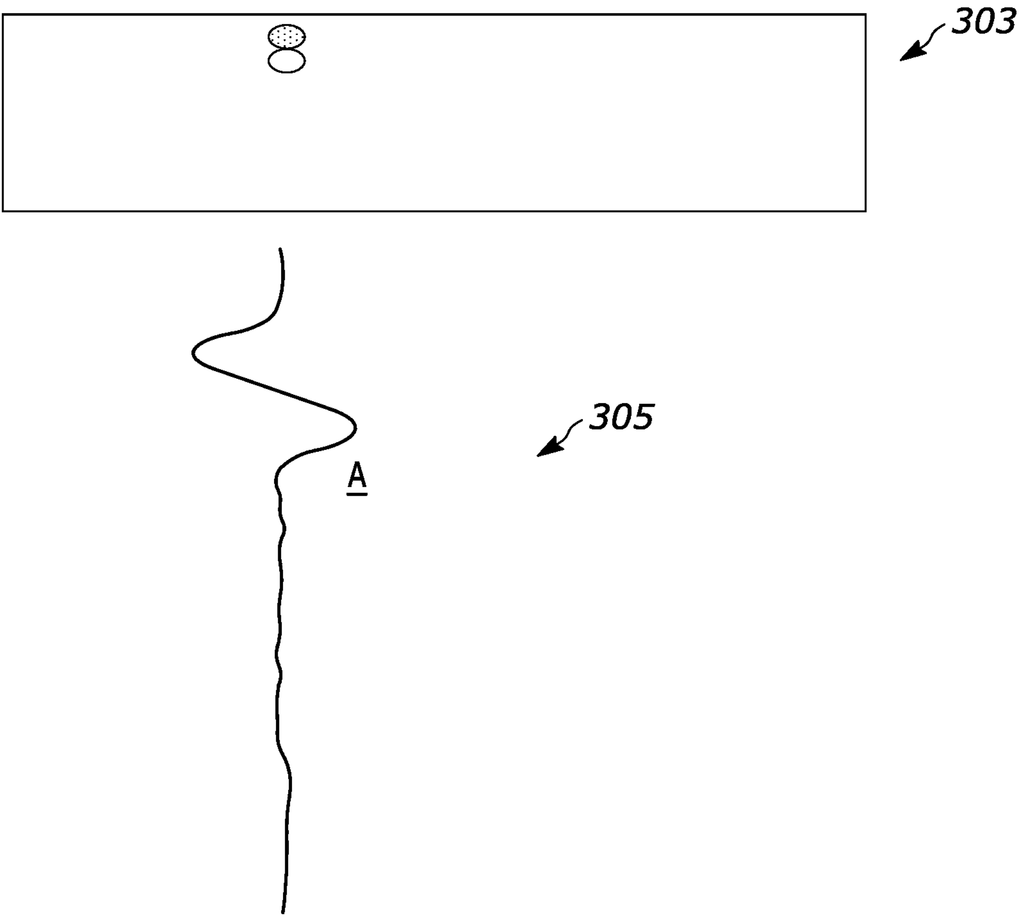
FIG. 3*b* is a diagram illustrating a magnetic image showing the magnetic response associated with breaks in the transverse direction.
Figure 3C:
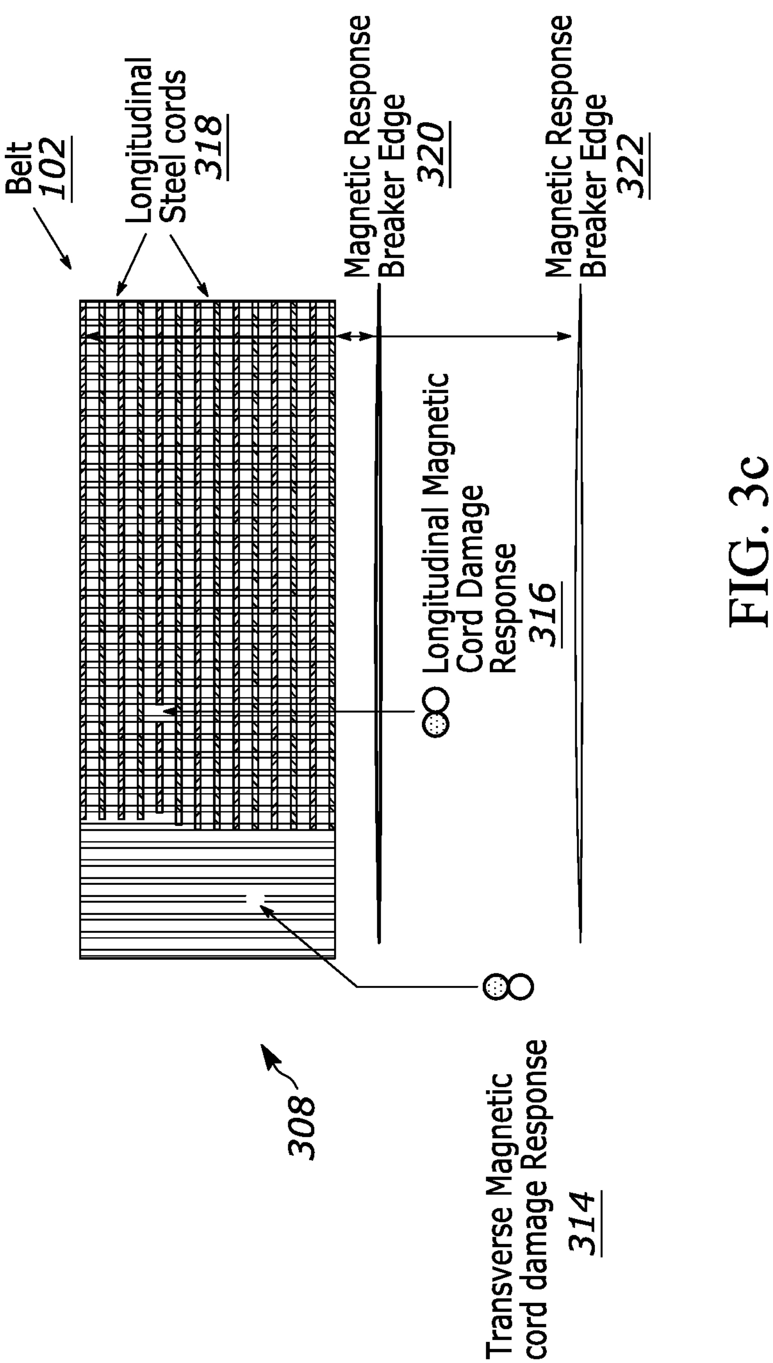
FIG. 3*c* is a diagram illustrating measured magnetic responses for the steel cord elements commonly found in conveyor belts.

FIGS. 3*a*, 3*b* and 3*c* are diagrams illustrating measured magnetic responses for the steel cord elements commonly found in conveyor belts.

3*a* depicts an example of a magnetic image 301 and magnetic waveform 302.

3*b* provides another example of a magnetic image 303 and response 305 (A).

3*c* provides illustrations of the associated magnetic responses 303 and 301 detected for damage to a transverse steel cord element 314 and longitudinal reinforcing steel cord element 318 of belt 102, 308. Also shown is breaker edge 320,322 and damage 316.

Although the following figures describe damage patterns associated with the conveyor belt 102 relative to longitudinal cord damage events in the illustrations, it is equally plausible that for textile or steel cord belts containing steel cord breakers, the magnetic damage patterns associated with the breaker could be utilized in the same fashion to generate insights into the root cause of the damage events.

Figure 4A:
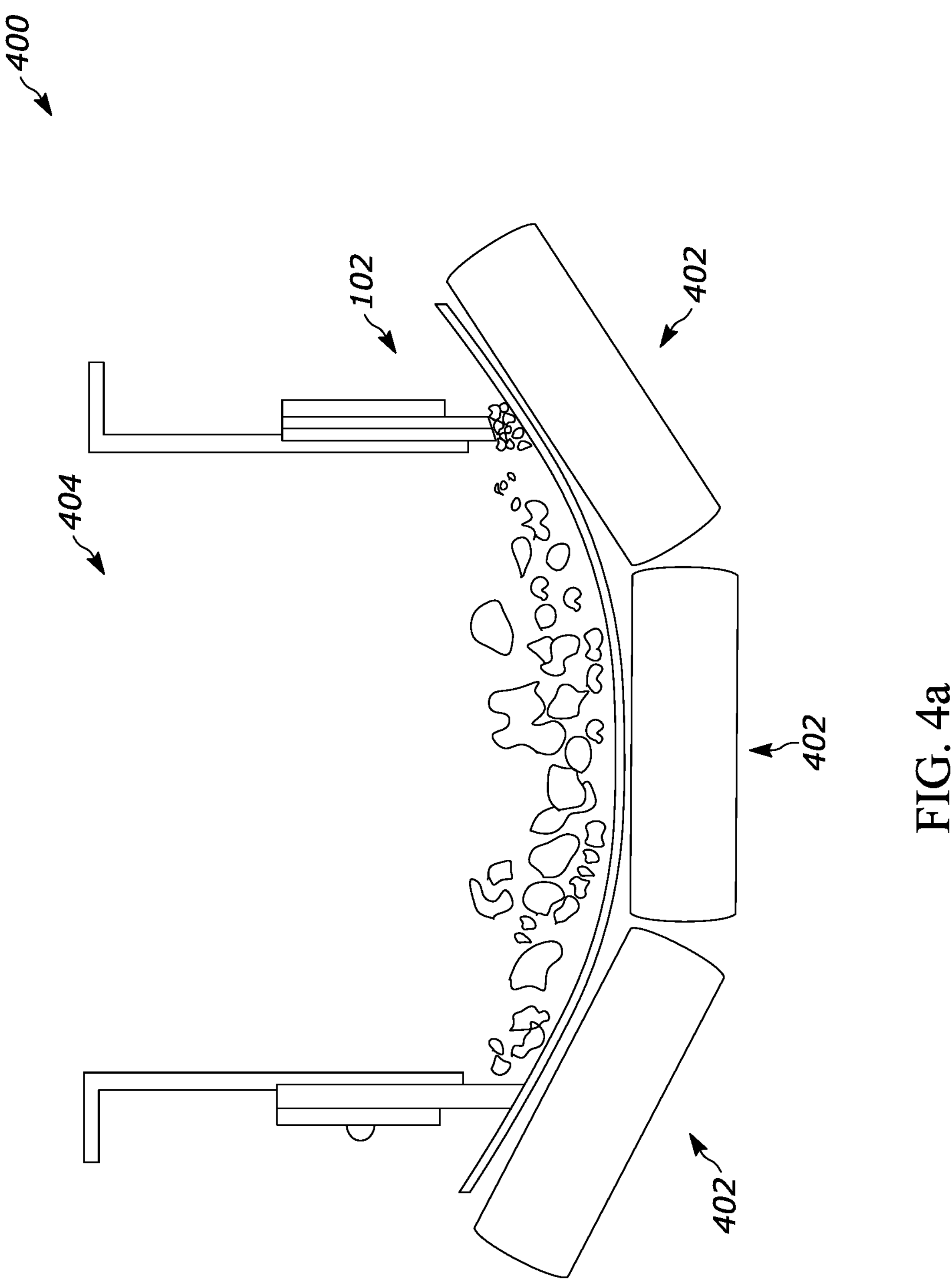
FIGS. 4*a* and 4*b* are diagrams illustrating an example of a potential damage pattern generated due to material interactions with the skirt board of the conveyor structure resulting in material becoming trapped between the skirt board and the conveyor belt 102.
Figure 4B:
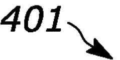
Figure 4B:
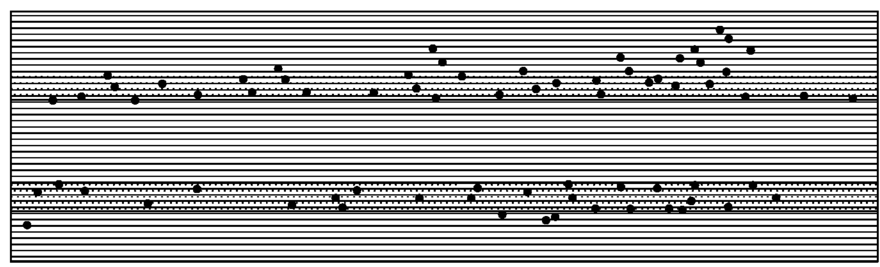

FIGS. 4*a* and 4*b* are diagrams illustrating an example of a potential damage pattern generated due to material interactions with the skirt board of the conveyor structure resulting in material becoming trapped between the skirt board and the conveyor belt 102.

4*a* depicts a typical conveyor loading zone 404 where the material is contained by the skirt boards on sides to minimize material spillage. The belt 102 is conveyed at least partially by rollers 402.

4*b* illustrates a potential damage pattern 401 that would be detected due to material interactions with the skirt board The circuitry 108 would identify the pattern associated with this damage and correlate the identified damage pattern with the skirt board position and separation to confirm the specific root cause. It should be noted that a system configured with the ultrasonic edge tracking sensor would greatly assist in aligning conveyor belt damage to conveyor accessory and structural elements by providing the important correlation of the belt position to the conveyor structure at the sensor array 106.

Figure 5A:
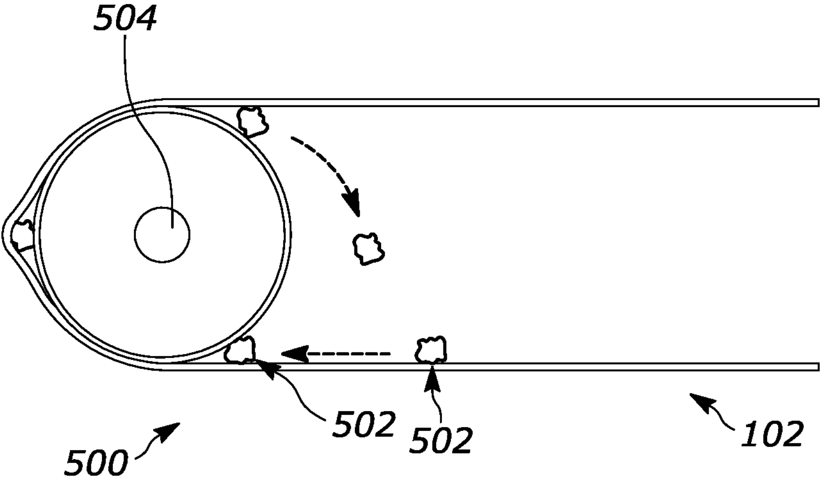
FIGS. 5*a* and 5*b* are diagrams illustrating an example of a potential damage pattern 501 generated due to material interactions with a conveyor system pulley 504 and the conveyor belt 102.
Figure 5B:
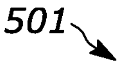
Figure 5B:
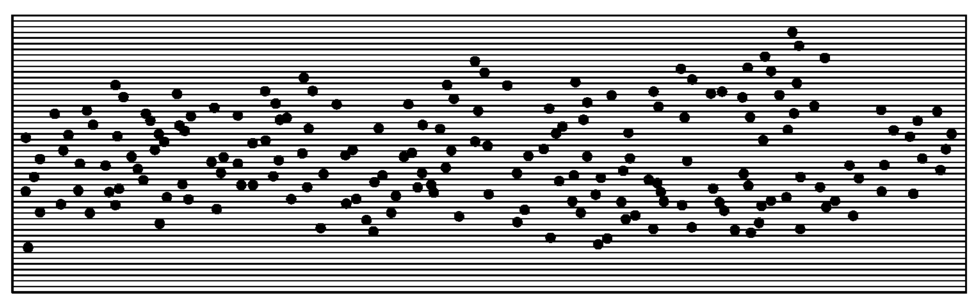

FIGS. 5*a* and 5*b* are diagrams illustrating an example of a potential damage pattern 501 generated due to material interactions with a conveyor system pulley 504 and the conveyor belt 102, as a result of material being trapped between the pulley and the conveyor belt.

A portion illustrates the material 502 becoming trapped and being pulled into a pulley 504 generating high strain events in the conveyor belt 102 which causes damage to the longitudinal steel cord elements.

A portion illustrates a potential damage pattern 501 that would be detected due to material interactions with the pulley 504.

The circuitry 108 in this case would detect a random pattern of damage events that would potentially occur across the entire width of the conveyor belt 102. In this case, the damage pattern along with the development of the damage over time with would be used by the machine learning algorithm in circuitry 108 in conjunction with the pulley width and skirt boards positions, to assist in differentiating this damage from impact damage patterns that will be described in FIG. 6

Figure 6A:
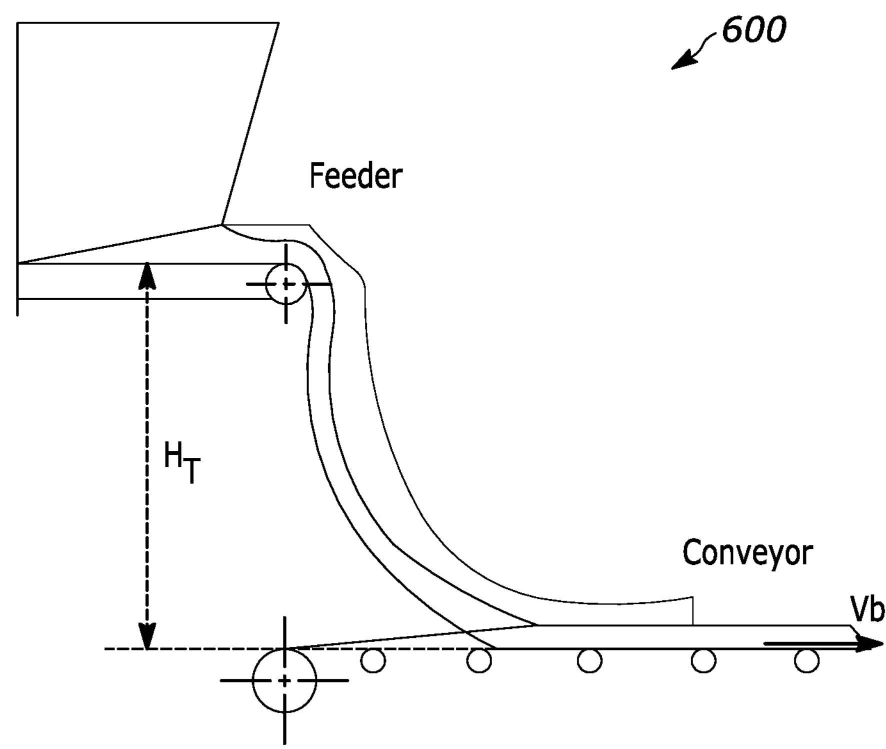
FIGS. 6*a* and 6*b* are a diagram illustrating an example of a potential damage pattern 601 generated at the load chute 600 due to material impacts with the conveyor belt 102.
Figure 6B:
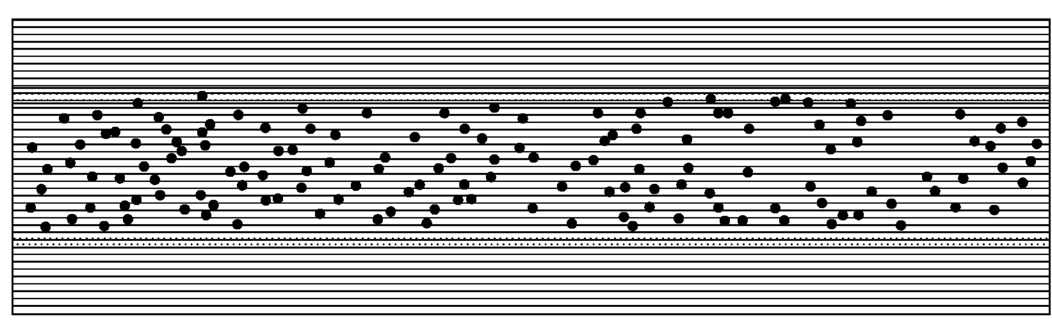

FIGS. 6*a* and 6*b* are diagrams illustrating an example of a potential damage pattern 601 generated at the load chute 600 due to material impacts with the conveyor belt 102.

6*a* illustrates the load chute 600, where material drops onto the conveyor belt 102 from a chute drop height HT. Potential wear or equipment issues, oversized ore or higher impact forces due to damaged or missing impact plates, can lead to high impact forces on the conveyor belt resulting in steel cord damages.

6*b* illustrates a potential damage pattern 601 that would be detected due to high impact events damaging the longitudinal steel cord damages across the loading area of the belt.

The circuitry 108, would also be configured to recognize the more randomized damage events of high impact events due to their location within the loading region of the belt. The described machine learning which would include the damage events and development of the damage pattern would facilitate the identification of the root cause associated with impact related damage.

Figure 7A:
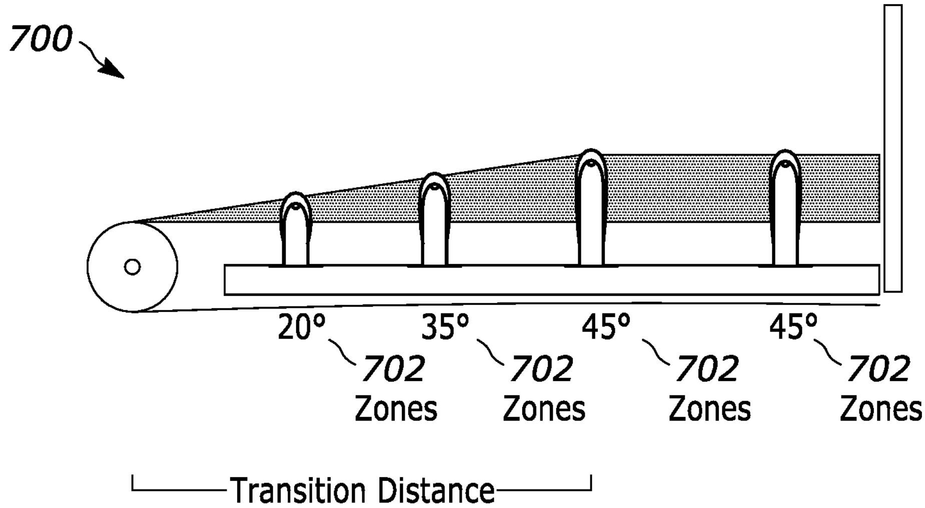
FIGS. 7*a* and 7*c* are diagrams illustrating an example of a potential periodic damage pattern generated 703 due to events associated with transition zones 702 having a length (transition distance) or those associated with a rotational component of the conveyor, such as a conveyor pulley.
Figure 7B:
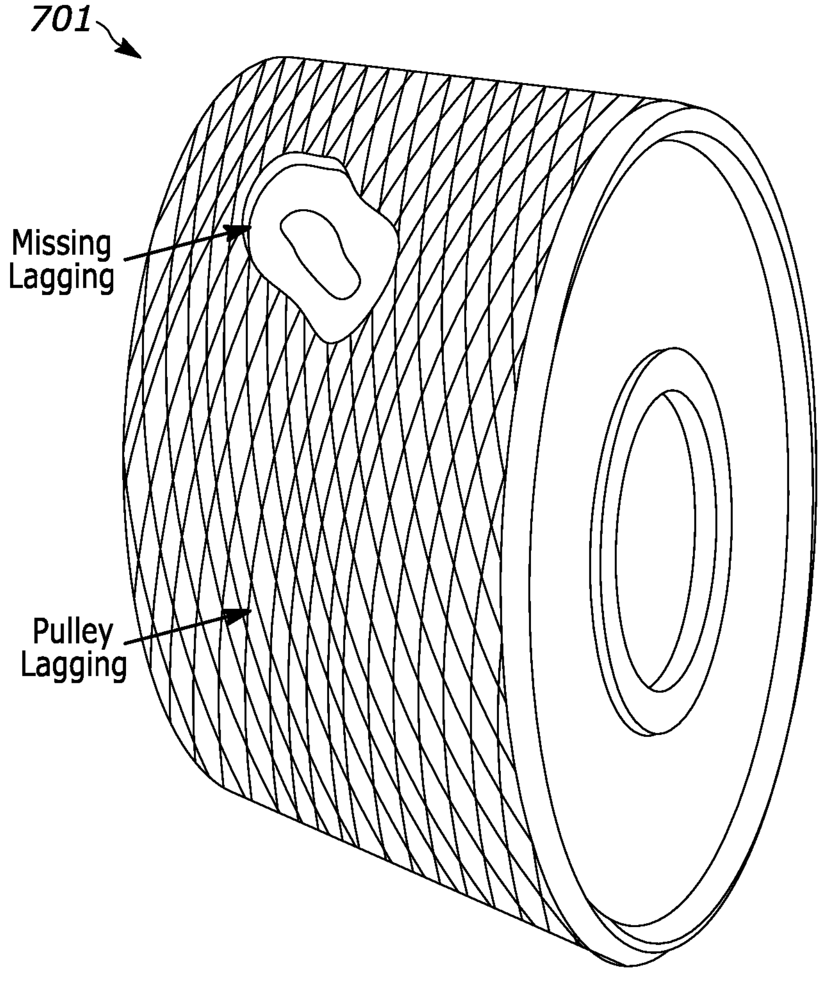
FIG. 7*b* is a diagram showing a pulley with damaged lagging.
Figure 7C:
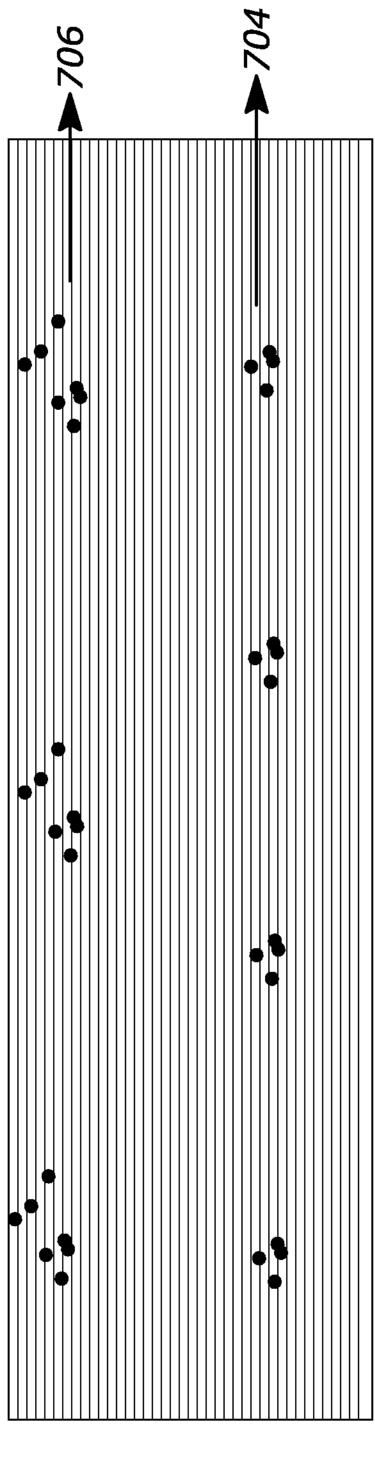

FIGS. 7*a*, 7*b* and 7*c* are a diagram illustrating an example of a potential periodic damage pattern generated 703 due to events associated with transition zones 702 having a length (transition distance) or those associated with a rotational component of the conveyor, such as a conveyor pulley.

In 7*a*, the length of the belts transition length is defined by the region where the belt changes from a flat configuration at the tail pulley to the trough configuration. Additionally, a typical rubber lagged pulley 701 is shown in 7*b* along with a lagged pulley that has a Missing Lagging as shown.

7*c* illustrates a potential damage pattern 703 that would be detected due to transition length issues causing periodic edge damages due to the build-up of stresses in the steel cord in the edge region of the conveyor belt 102. As the stresses typically become elevated at the same length, these breaks occur at a repeating or periodic length. Similarly, the periodic damage associated with pulley lagging defects would occur at distance associated with the circumference of the associated damaged pulley. It should be noted that contamination on the pulley would potentially have the same periodic damage effect as missing lagging.

In instances where periodic damage patterns are detected, the circuitry 108 would utilize the conveyor structure design elements to correlate damage and location of the damage to design elements, like any system pulley diameters, turn-over length, tail transition length, discharge transition length, or other structural element that could align with the periodic damage observed.

Figure 8A:
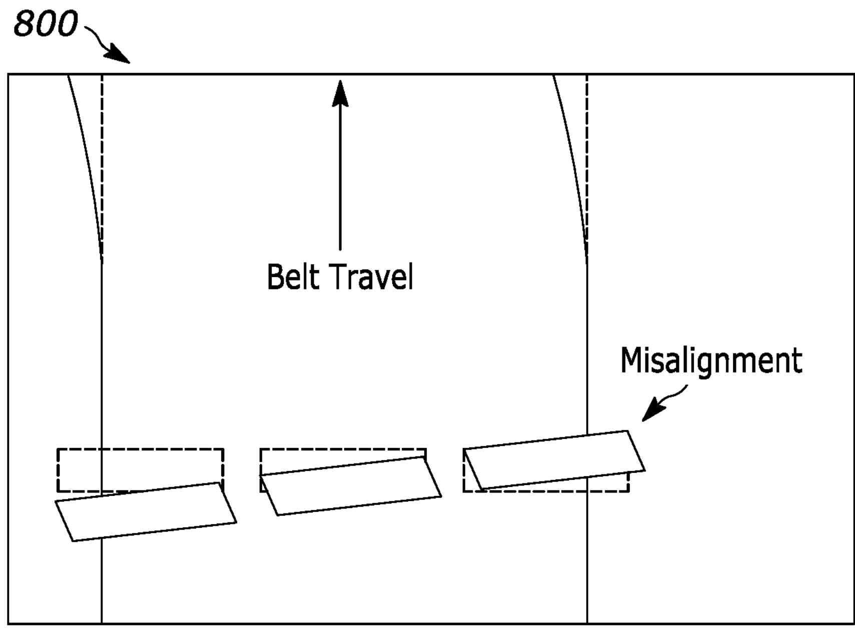
FIGS. 8*a*, 8*b*, and 8*c* are a diagram illustrating an example of a potential damage pattern generated 800 due to events associated with misalignment during the operation of the conveyor belt 102.
Figure 8B:
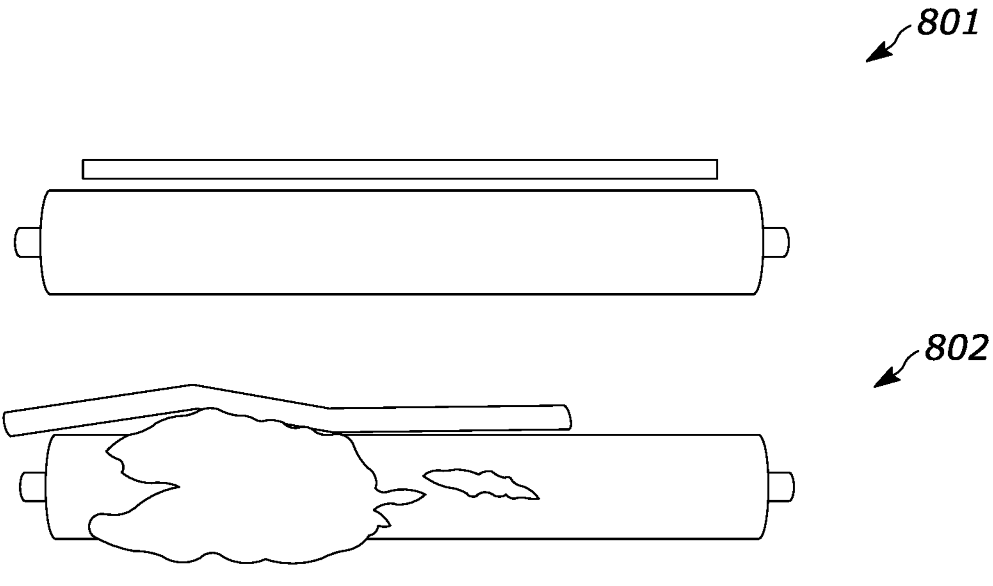
Figure 8C:
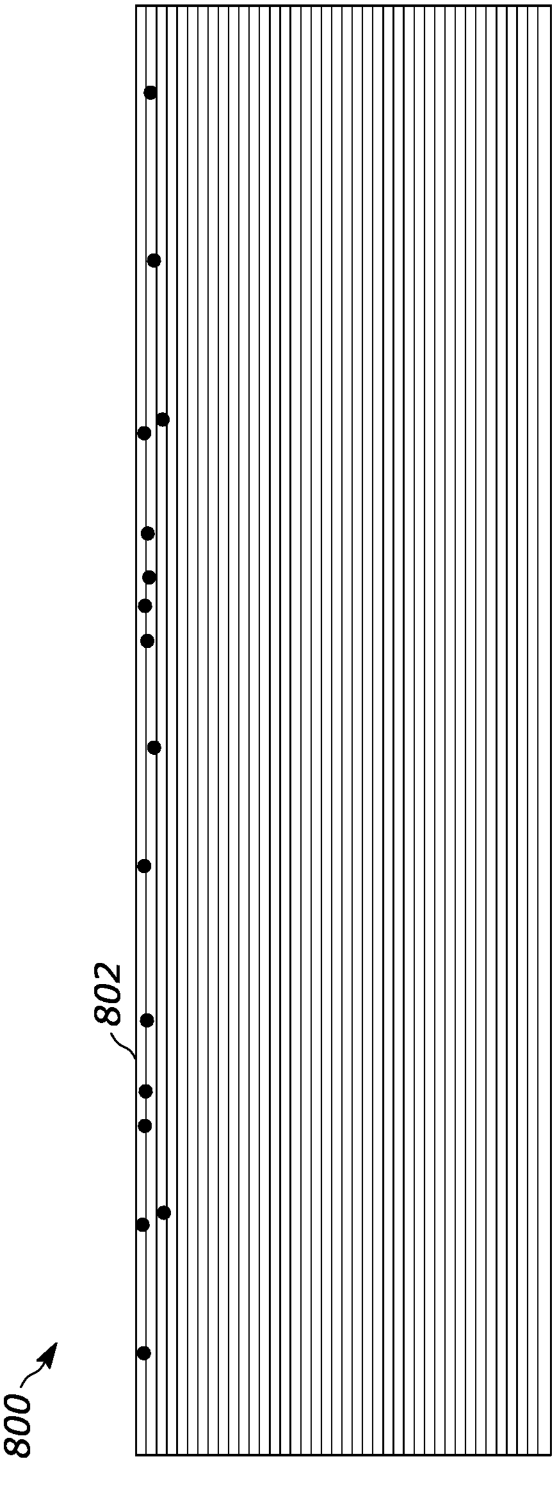

FIGS. 8*a*, 8*b*, and 8*c* are a diagram illustrating an example of a potential damage pattern generated 800 due to events associated with misalignment during the operation of the conveyor belt 102.

8*a* and 8*b* shows a conveyor belt 102 that is misaligned with the center line of the conveyor structure. Misalignment could be generated by damage or an internal defect within the conveyor belt, this could be a large damage event on the edge of the conveyor belt or a result of an asymmetry in the layout of a splice that joins two conveyor belt sections. Misalignment of the conveyor belt on the conveying system could also occur due to misalignment of the conveyor belt structural elements, such as a pulley. When any of these root causes occur, the belt can move in the transverse direction away from the center of the conveyor with the potential to interact with the conveyor structure. If the belt does interact with the conveyor structure, damage can occur to the steel cords at the edge of the conveyor belt 102.

8*c* illustrates the resulting damage pattern that could be generated by this interaction. Depending on the root cause, this damage could be intermittent and localized or occur over the entire length of the conveyor belt. The machine learning of the damage pattern and development of the damage pattern is key to generating accurate root cause insights that will accelerate the identification and resolution of the damage generating event.

Figure 9:
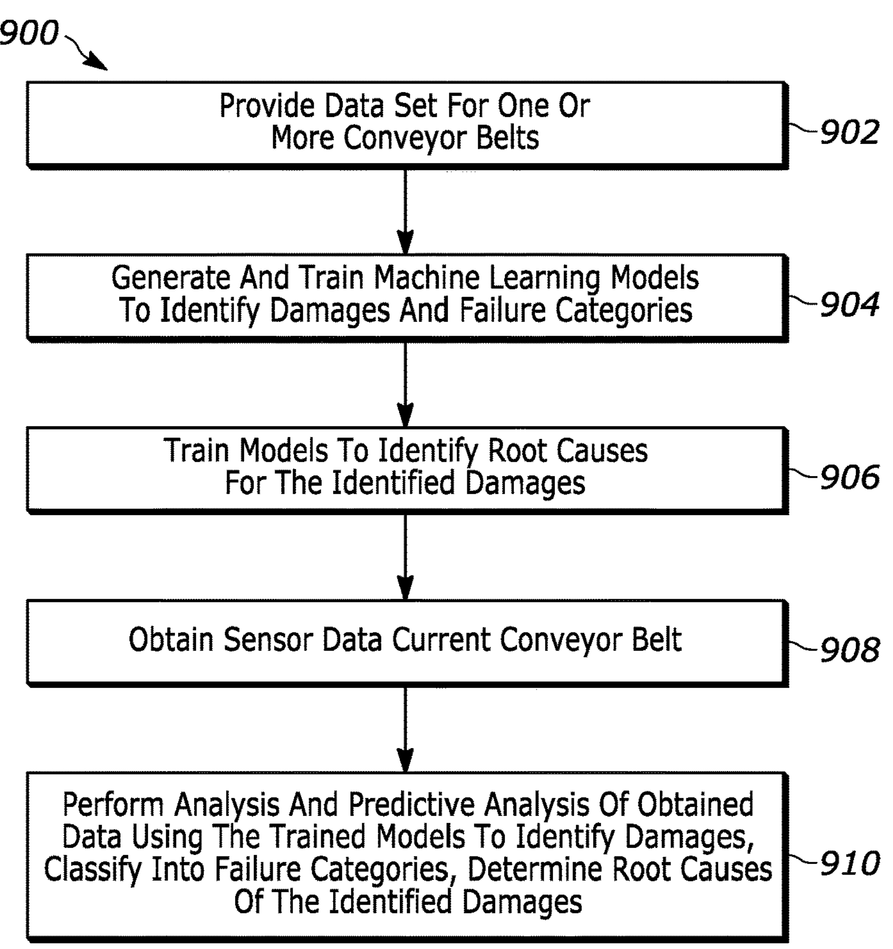
FIG. 9 is a flow diagram illustrating a method 900 for determining root causes in accordance with one or more embodiments.

FIG. 9 is a flow diagram illustrating a method 900 for determining root causes in accordance with one or more embodiments.

The method 900 can be used with or by the system 100 and/or variations thereof.

A data set is provided at 902. The data set includes patterns or images from prior monitoring and include correlation to damages.

The system 100 trains machine learning models at 904 to identify damages and failure categories using the data set.

The system 100 trains the machine learning models at 906 to identify root causes.

The system 100 generates and/or obtains local data for a current or local conveyor belt at 908.

The system 100 analyzes the local data using the trained models to identify damages, classify the damages into failure categories and determine root causes of the identified damages at 910.

Figure 10:
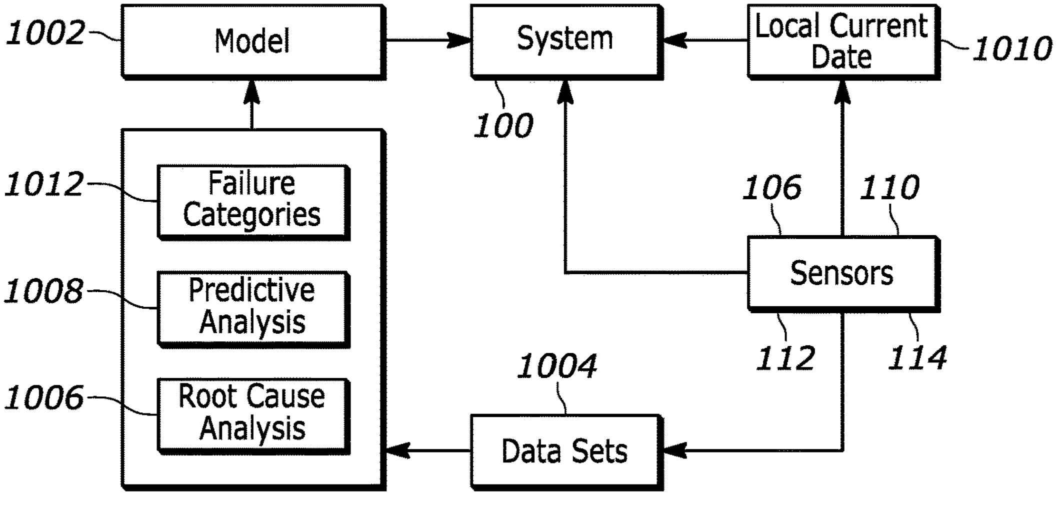
FIG. 10 is a diagram illustrating a system for determining root causes.

FIG. 10 is a diagram illustrating a system for determining root causes. The system can incorporate and/or be incorporated into the system 100.

It is appreciated that suitable variations of the system is contemplated.

The system can utilize machine learning, neural networks and the like, as shown above, to operate.

The system includes system 100, a model 1002, failure categories 1012, predictive analysis 1008, root cause analysis, data sets 1004, sensors 106, 110, 112, 114, and date 1010.

It is envisioned that the embodiments can solve the problem associated with the identification of the root cause of observed damage events in the conveyor belt, by automating the process utilizing the proposed system that applies machine learning and higher-level analytics from data collected from conveyors across the globe, to generate root cause insights that can be quickly verified and corrected by the end user. This solution shortens the time associated with root cause identification and allows for corrective actions to take place to eliminate the source of the damage generator, thus saving the end user money and downtime, while extending the working life of the conveyor belt and thus increasing the functional capacity of that belt operation due to the increased operational life.

The foregoing description of the embodiments has been provided for purposes of illustration and description. Example embodiments are provided so that this disclosure will be sufficiently thorough and will convey the scope to those who are skilled in the art. Numerous specific details are set forth such as examples of specific components, devices, and methods, to provide a thorough understanding of embodiments of the disclosure but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit, a Digital Signal Processor, a Field Programmable Gate Array, a Programmable Logic Controller, a Complex Programmable Logic Device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for monitoring steel cord damage within a conveyor belt to determine potential root cause(s) of damages, the system comprising:

- a generator array configured to apply a magnetic field to a conveyor belt;
- a sensor array configured to measure a plurality of magnetic responses; and
- circuitry configured to a map a plurality of damage events of the conveyor belt, identify a damage pattern based on the map, identify one or more root causes for the identified damage pattern, and utilize machine learning based on the tracked damage pattern to identify damage patterns associated with specific root causes for that damage, wherein the map comprises a transverse location and a longitudinal location for each damage event and the circuitry is configured to track the development of a given conveyor belt damage pattern over time.

2. The system of claim 1, the circuitry is configured to utilize a tachometer to provide longitudinal location data.

3. The system of claim 1, the circuitry is configured to utilize a proximity sensor to measure the position of the edge of the belt to more accurately provide transverse belt position for damage location data.

4. The system of claim 1, the circuitry is configured to utilize an RFID reader to identify and track specific magnetic signatures relative to a unique traceable belt position.

5. The system of claim 1, where the circuitry is configured to identify specific root causes for damage patterns generated in the longitudinal steel cord of the conveyor belt.

6. The system of claim 1, where the circuitry is configured to identify specific root causes for damage patterns generated in a magnetic transverse element of the conveyor belt.

7. The system of claim 1, where the circuitry is configured to utilize conveyor design inputs to correlate damage position to specific conveyor components and operations that impact defined regions of the conveyor belt.

8. The system of claim 1, where the circuitry is configured to recognize pattern development in the magnetic data to accelerate root cause identification.

9. The system of claim 1, where the circuitry is configured to utilize a global data set from a plurality of conveyor belt systems.

10. The system of claim 9, the global data set comprises prior damage patterns and associated root causes.

11. The system of claim 10, the circuitry utilizes the prior damage patterns and the associated root causes to further identify the one or more root causes.

12. The system of claim 1, the circuitry evaluates the one or more root causes and classifies the one or more root causes according to severity.

13. The system of claim 12, the circuitry generates an alarm based an the classified one or more root causes.

14. The system of claim 1, where the circuitry is configured to identify specific root causes for damage patterns generated in a magnetic longitudinal element of the conveyor belt.

15. The system of claim 1, where the circuitry is configured to identify specific root causes for damage patterns generated in a both magnetic transverse and longitudinal elements of the conveyor belt.

16. A system for monitoring steel cord damage within a conveyor belt to determine potential root cause(s) of damages, the system comprising:

a generator array configured to apply a magnetic field to a conveyor belt;

a sensor array configured to measure a plurality of magnetic responses;

circuitry configured to map a plurality of damage events of the conveyor belt, identify a damage pattern based on the map, identify one or more root causes of the identified damage pattern, and utilize machine learning based on the tracked damage pattern to identify damage patterns associated with specific root causes for that damage;

a proximity sensory to measure the position of the edge of the belt to more accurately provide transverse belt position for damage location data; and the map comprising a transverse location and a longitudinal location for each damage event, wherein the circuitry is configured to track a given conveyor belt damage pattern over time.

17. The system of claim 16, the circuitry evaluates the one or more root causes and classifies the one or more root causes according to severity.

18. The system of claim 16, wherein the circuitry trains one or more models based on prior monitoring and root cause associations.

* * * * *